(12) United States Patent
Kaplingat et al.

(10) Patent No.: US 10,055,305 B2
(45) Date of Patent: Aug. 21, 2018

(54) TECHNIQUES TO PERFORM SYSTEM MANAGEMENT PROCESSING FOR DATABASE SYSTEMS

(71) Applicant: NETAPP, INC., Sunnyvale, CA (US)

(72) Inventors: Nikhil Kaplingat, Bangalore (IN); Praveen Kumar, Bangalore (IN); Deepa G, Bangalore (IN); Shaswati Shee, Bangalore (IN); Suman Ramachandra, Bangalore (IN); Krishnan Chandrashekar, Bangalore (IN); Lokesha Subbareddy, Bangalore (IN); Vrishali Thorat, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 235 days.

(21) Appl. No.: 15/141,468

(22) Filed: Apr. 28, 2016

(65) Prior Publication Data
US 2017/0315877 A1    Nov. 2, 2017

(51) Int. Cl.
*G06F 17/00* (2006.01)
*G06F 11/14* (2006.01)
*G06F 17/30* (2006.01)

(52) U.S. Cl.
CPC .... *G06F 11/1458* (2013.01); *G06F 17/30091* (2013.01); *G06F 17/30227* (2013.01); *G06F 2201/84* (2013.01)

(58) Field of Classification Search
CPC ............... G06F 17/30; G06F 17/30091; G06F 17/30227; G06F 11/1458
USPC .................................................. 707/600–899
See application file for complete search history.

(56) References Cited

U.S. PATENT DOCUMENTS

2007/0005669 A1 *   1/2007   Mueller ............ G06F 17/30312

\* cited by examiner

*Primary Examiner* — Isaac M Woo
(74) *Attorney, Agent, or Firm* — Klein, O'Neill & Singh, LLP

(57) ABSTRACT

Various embodiments are generally directed an apparatus and method for performing a discovery operation to determine a system layout for a database and one or more files for a dataset stored in the database and performing a backup operation on the dataset to cause storage of a backup copy of each of the one or more files and collect metadata associated with the backup copy of each of the one or more files, the metadata to enable restoration of the one or more files.

27 Claims, 13 Drawing Sheets

600

PERFORM A DISCOVERY OPERATION TO DETERMINE A SYSTEM LAYOUT FOR A DATABASE AND ONE OR MORE FILES FOR A DATASET STORED IN THE DATABASE
605

PERFORM A BACKUP OPERATION ON THE DATASET TO CAUSE STORAGE OF A BACKUP COPY OF EACH OF THE ONE OR MORE FILES AND COLLECT METADATA ASSOCIATED WITH THE BACKUP COPY OF EACH OF THE ONE OR MORE FILES, THE METADATA TO ENABLE RESTORATION OF THE ONE OR MORE FILES
610

*FIG. 6*

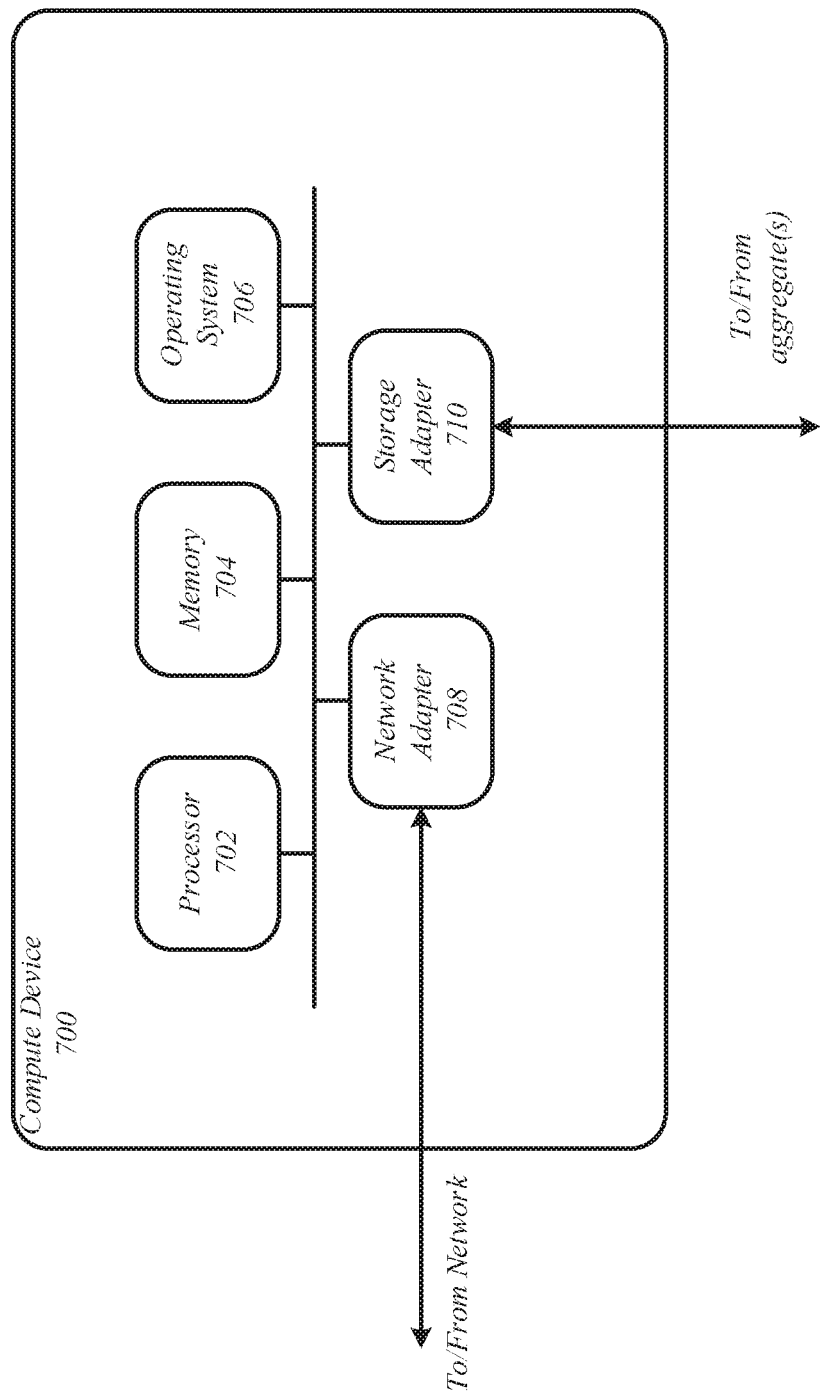

TECHNIQUES TO PERFORM SYSTEM MANAGEMENT PROCESSING FOR DATABASE SYSTEMS

TECHNICAL FIELD

Embodiments described herein generally relate to performing system management processing for database systems, including performing discovery operations, backup operations, restore operations, clone operations, verification operations and mount operations.

BACKGROUND

Storage systems may store and provide information to one or more computing systems in a network, such as a storage area network (SAN), network-attached storage (NAS), virtualized storage utilizing a virtualization layer, and so forth. More specifically, a computing system including one or more applications may write information to a storage system and read information from the storage system over one or more connections, such as networking connections. These storage systems typically require a high level of system management to provide high availability and fault tolerance capabilities. Thus, embodiments may be directed to providing system management capabilities.

BRIEF DESCRIPTION OF THE DRAWINGS

Embodiments described herein are illustrated by way of example, and not by way of limitation, in the figures of the accompanying drawings in which like reference numerals refer to similar elements.

FIG. 6 illustrates an exemplary embodiment of a fifth logic flow.

FIG. 7 illustrates an exemplary embodiment of a computing system.

DETAILED DESCRIPTION

Figure 1:
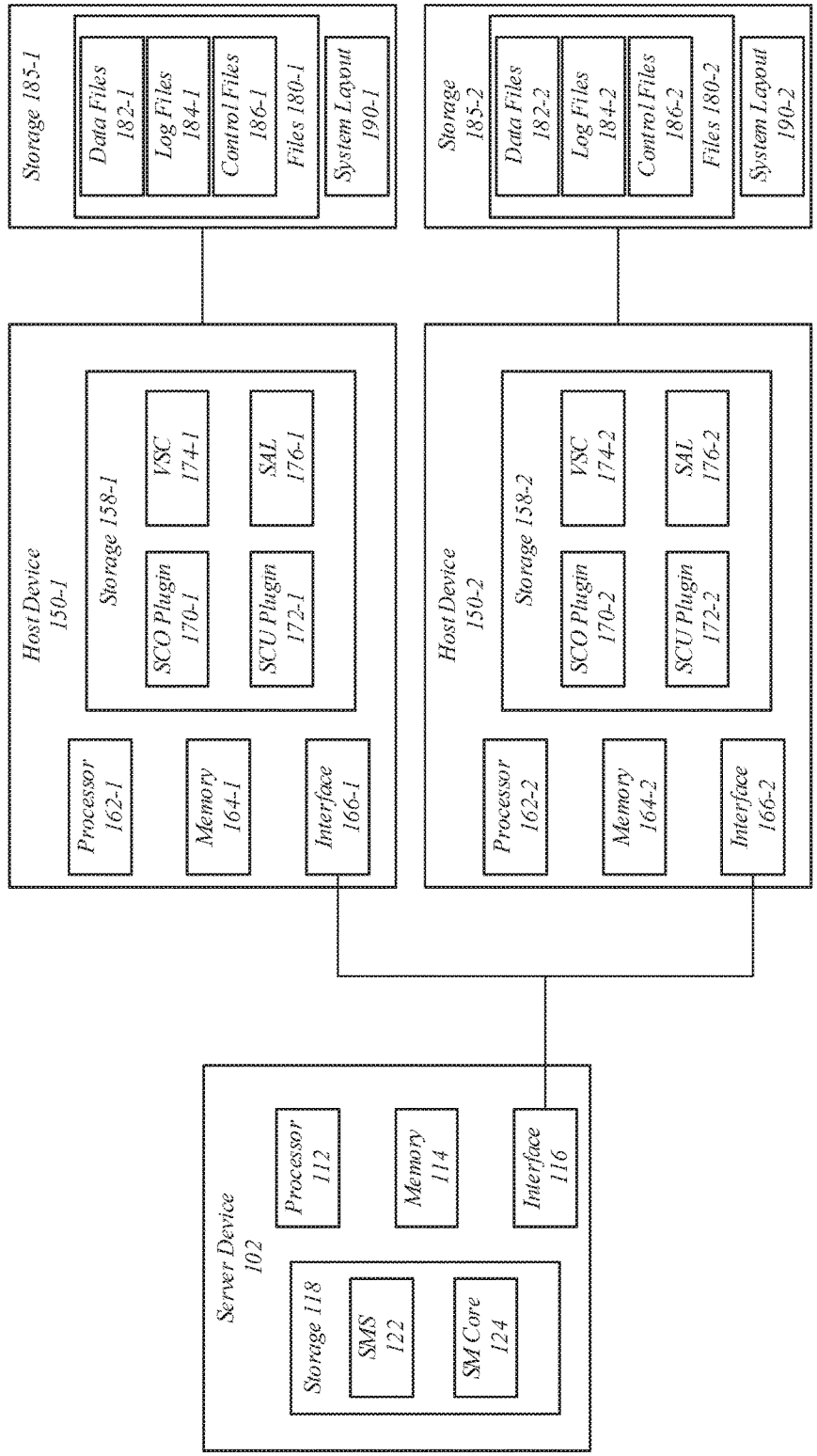
FIG. 1 illustrates an example embodiment of a computing system.

Various embodiments are directed to systems, devices, apparatuses, methods and techniques to provide system management capabilities for database systems having server devices, host devices, and storage devices. Some embodiments may include a centralized system management system for data management of applications, virtual machines and file systems for these devices. These system management capabilities may include discovery operations to discover system layouts for databases and files stored in the databases, providing backup operations to back up files stored on the databases, and restore/clone capabilities.

Some embodiments may include performing a discovery operation to determine a system layout for a database and one or more files for a dataset stored in the database which may include a server database and/or a repository. The one or more files may include at least one of data files, control files, online redo log files, archived redo log files and so forth. The system layout can include a storage type, a filesystem type, and one or more system settings comprising at least one of an automatic storage management setting, a data guard setting, and a virtualization setting.

In some embodiments, a backup operation may be performed on the dataset to cause storage of a backup copy of each of the one or more files and to collect metadata associated with the backup copy of each of the one or more files. The metadata may include information to enable restoration, recovery, and cloning of the one or more files, filesystem or database. The metadata information may be stored in a rational scheme in a master/transactional pattern. In some embodiments, the backup operations may collect static metadata during an initial backup and dynamic metadata during one or more subsequent backups, the dynamic metadata may include transactions or delta changes associated with the one or more files. In some instances, the database and filesystem may enter a quiesced state prior to performing the backup operation and exit the quiesced state subsequent to performing the backup operation. However, embodiments are not limited in this manner. For example a "hot backup" may be performed without requiring quiescing the database.

Embodiments may also support performing backup operations with various types and granularities and take application consistent or crash consistent backups. Different types of backups may include online backups, offline backups and crash consistent backups. Different backup granularities may include backing up a complete database including data files, log files and control files, backing up archived redo log files only, or backing up data files and control files only. Further, the backup operation may include performing a backup on the dataset stored in a database which may have multiple or different system layouts.

As mentioned, embodiments may include restoring the backup copy of each of the one or more files in a database. Each of the databases may include one or more system layouts. The restoration operation may restoring a database by applying one or more system layouts utilizing server devices, host devices and storage devices. Further, prior to generating the databases, the system layouts may be validated to ensure a proper system configuration. The one or more files backed up may be restored in the databases on the storage devices utilizing the metadata, for example. Embodiments may not be limited in this manner. Similarly, clone operations may be performed for datasets via generating a new database having a same system layout as another database and utilizing the backup copy of each of the one or more files and metadata. For example, the one or more files may be copied to the new database to provide a clone using NetApp's® FlexClone® technology where a snapshot is cloned on the storage system, for example. Embodiments are not limited in this manner.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a general overview of a system 100 including a server device 102, host devices 150-1 and 150-2, each coupled with storage devices 185-1 and 185-2, respectively. In embodiments, the devices may include a number of components to provide system management capabilities including discovery operations, backup operations, restore operations and cloning operations.

In some embodiments, the server device 102 may include a processor 112, a memory, an interface 116 and storage 118. Further, the storage 118 may include a system management service (SMS) component 122 and a system management (SM) Core component 124 to provide system maintenance and management capabilities for the datasets. The SMS component 122 and the SM Core component 124 may be implemented in hardware only, software only, or combination thereof. In some instances, the SMS component 122 and the SM core component 124 may be implemented in an object oriented programming language, such as Java, C++, C#, and so forth. Further, the SMS component 122 and the SM Core component on 124 may provide centralized system management functionality for database systems and may be part of a software suite, such as NetApp's® SnapCenter® Enterprise software. The SMS component 122 and SM Core component 124 can deliver a unified, scalable platform and plug-in suite for application-consistent data protection and clone management. Enterprises can empower application and database administrators to self-manage their own data protection and copies, as will be discussed in more detail below.

In embodiments, the SMS component 122 may control various operations discussed herein, including performing discovery operations, backup operations, restore operations, and clone operations. For example, the SMS component 122 may initialize and communicate requests to perform these operations. In some instances, these requests may be communicated based on settings or user interactions. For example, a user may initialize a backup by interacting with a graphical user interface (GUI) that may be received and processed by the SMS component 122. In another example, one or more settings may be configured to cause the SMS component 122 to initialize the discovery operations, the backup operations, the restore operations, and/or the clone operations. More specifically, one or more these operations may be performed in a periodic or semi-periodic basis based on configuration settings. Further, the SMS component 122 may initialize these operations by communicate a request to the SM core component 124, which may be in the form of a call method or function. Other techniques may be used to initialize the operations and embodiments are not limited in this manner.

In some embodiments, the SMS component 122 may process and handle the results of the operations. The SMS component 122 may receive a result to the call function or method which may include the result of a particular operation. For example, the discovery operation may return a result and cause the SMS component 122 to enable or allow a user to utilize one or more of the discovered resources. The results may include a system layout and detected files for a database, for example. In another example, the SMS component 122 may register a data backup and metadata for files and logs based on the result of a backup operation. In a third example, the SMS component 122 may register a clone as a result of performing a clone operation. Embodiments are not limited to these examples.

In embodiments, the SM Core component 124 may receive and process requests issued by the SMS component 122. To process these requests the SM Core component 124 may communicate one or more requests to one or more other components, such as those components of the host devices 150-1 and 150-2. These requests may be in the form of call functions or methods to the components and may be communicated via interfaces 116, 166-1, and 166-2. In some instances, a call may be made to a specific component of the host devices 150-1 and 150-2 based on the desired results of the SM Core component 124. These desired results may include the results of discovery operations, backup operations, restore operations and clone operations.

The SM Core component 124 may receive responses to the requests and return results to the SMS component 122. For example, the SM Core component 124 may receive an indication of resources from one or more of the components of the host devices 150-1 and 150-2 during a discovery operation and provide these indications to the SMS component 122. These indications may include databases, data files, log files, control files, a system layout and so forth. Embodiments, the SMS component 122 may enable the resources for use based on the discovery operation.

In another example, the SM Core component 124 may return indications or results of a backup operation to the SMS component 122. The results may include files and associated metadata which may be registered with the SMS component 122. In a third example, the SM Core component 124 may return a result of a restore operation to the SMS component 122 indicating whether the restore operation was successful or not. A similar indication may be provide from the SM Core component 124 to the SMS component 122 indicating whether a clone operation was successful or not.

In embodiments, the server device 102 may include other components including processor 112, memory 114 and interface 116 to process information and enable communication with other devices, such as host devices 150-1 and 150-2. The processor 112 may be any type of computational element capable of processing information, such as such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processing circuitry, processor or processing circuit on a single chip or integrated circuit. The processor 112 may be connected to and communicate with the other elements of the server device 102 including the memory 114 and the interface 116.

The memory 114 can be implemented using any machine-readable or computer-readable media capable of storing data, including both volatile and non-volatile memory. In some embodiments, the machine-readable or computer-readable medium may include a non-transitory medium. The embodiments are not limited in this context. The memory 114 can store data momentarily, temporarily, or permanently. The memory 114 stores instructions and data for server device 102. The memory 114 may also store temporary variables or other intermediate information while the processor 112 is executing instructions. The memory 114 is not limited to storing the above discussed data; the memory 114 may store any type of data.

The server device 102 may also include one or more interfaces 116 which may enable the server device 102 to communicate over a network environment including one or more communication links, which may be wireless, wired or a combination thereof links. For example, the server device 102 may communicate with the host devices 150-1 and 150-2 via an interface 116 which may be a network interface, for example.

The host devices 150-1 and 150-2 may also each include a processor 162, a memory 164, an interface 166, and storage 158, which may be similar to the liked named components in server device 102. Further, each of the storages 158 may include one or more plugin components, such as a SCO Plugin component 170 for object-relational databases such as an Oracle® database, and a SCU plugin component 172 for managing host side storage devices for an Oracle® database, such as a database residing on a UNIX® filesystem. The storages 158 may also each include a virtual storage console (VSC) component 174, and a storage abstraction layer (SAL) component 176. The components of the host devices 150-1 and 150-2 may provide various functionality to enable operations for the system 100 including discovery operations, backup operations, restore operations, and clone operations as will be discussed in more detail below.

In some embodiments, one or more of the components may be distributed to the host devices 150-1 and 150-2 by the server device 102. For example, the server device 102 including the SMS component 122 and the SM Core component 124 may distribute one or more of the SCO plugin component 170, the SCU plugin component 172, VSC component 174, and SAL component 176 to each of the host devices 150-1 and 150-2 as part of a centralized data protection and management process. For example, the server device 102 may communicate a package to each of the one or more host devices 150-1 and 150-2 including the appropriate components via interfaces 116, 166-1 and 166-2.

In some embodiments, the host devices 150-1 and 150-2 may each be coupled with storage devices 185-1 and 185-2, respectively. For example, a host device 150 may be coupled with a storage device 185 via an interface. Further, a storage device 185 may be any type of storage device such as a non-volatile storage unit including a hard disk drive, a secure storage device (SSD), a flash memory, and so forth. Moreover, the storage device 185 can include all traditional hard drives, all flash drives, and a combination thereof. Further, a storage device 185 may support different storage type configurations a network-attached storage (NAS) configuration or a storage area network (SAN) configuration. In some embodiments, a storage device 185 may be a database system including a number of non-volatile memory devices to store data and information in a database format, for example. In one specific example, a storage device 185 may include an object-relational database system, such as an Oracle® database. The storage devices 185 may also support database virtualization which decouples the database layer from particular storage devices 185. A virtual database may be accessed via virtual or logical addressing. Embodiments are not limited in this manner.

The storage devices 185-1 and 185-2 may also include or support any type of filesystem such as a disk file system including, but not limited to, file allocation table (FAT) (FAT12, FAT16, FAT32), extended FAT (exFAT), new technology filesystem (NTFS), hierarchical file system (HFS) and HFS plus (HFS+), high performance file system (HPFS), UNIX file system (UFS), second extended filesystem (ext2), third extended filesystem (ext3), fourth extended filesystem (ext4), XFS, Veritas File System, virtual machine filesystem (VMFS), ZFS, Reiser filesystem (ReiserFS), universal disk format (UDF), and so forth. In some embodiments, a storage device 185 may include and support Oracle's® automatic storage management (ASM) volume manager and filesystem. Further, a storage device 185 may support the filesystem residing on a Linux Logical Volume Manager (LVM) device or multipath device. Embodiments are not limited in this manner.

In some embodiments, a storage device 185 may include underlying devices such as Internet Small Computer System Interface (iSCSI), Fibre Channel (FC), virtual machine disk (VMDK), and raw device mapping (RDM) devices, for example. These devices, may enable a host device 150 to communicate with a coupled storage device 185 based on supported underlying devices. A storage device 185 may include VMDKs from VMFS or NFS datastores when implemented using virtualization. In another example, a storage device 185 may implement RDM utilizing FC or iSCSI logical unit numbers (LUNs). Embodiments are not limited to these examples.

In embodiments, a storage device 185 may also support various configuration settings such automatic storage management (ASM) settings, data guard settings, virtualization settings, and so forth. Embodiments are not limited to these examples. ASM settings may include disk group configurations including a number of disks in a group for a database, mirroring configurations indicating a database to provide a mirror, failure group configurations indicating disks to provide failover capabilities, and so forth. The data guard settings includes settings for standby databases which may be configured on one or more storage devices 185, such as Oracle® Active Data Guard and Active Data Guard Standby. The database virtualization settings may include settings for virtual data partitioning and horizontal data partitioning for virtualized databases. These settings may apply to one or more databases stored one or more storage devices 185.

In various embodiments, a storage device 185 may support any number of databases having various configurations and settings. In some embodiments, a single database may span across multiple storage devices 185. Moreover, one or more storage devices 185 may support different system layout configurations including storage types, filesystems and configurations settings, for example. In one specific example, the storage device(s) 185 may include a single database spanning across ASM or non-ASM SAN or NAS layouts having various ASM settings, data guard settings, and virtualization settings.

Moreover, the storage devices 185-1 and 185-2 may include and store information and data in one or more databases, for example. In the illustrated example, the storage device 185-1 may include one or more databases having files 180-1 and system layout information 190-1 and storage device 185-2 may include files 180-2 and system layout 190-2. Note that the files 180 and the system layout information 190 may be different for each storage device 185 or the same. Further, the files 180-1 on storage device 185-1 may include data files 182-1, log files 184-1 and control files 186-1. Similarly, files 180-2 on storage device 185-2 may include data files 182-2, log files 184-2 and control files 186-2. In some embodiments, the files 180-1 and system layout information 190-1 may be associated with a particular database and files 180-2 and system layout information 190-2 may be associated with a different database. In the same or other embodiments, the files 180-1 and 1802 and system layout information 190-1 and 190-2 may be associated with a same database. Embodiments are not limited in this manner. Embodiments are not limited in this manner and to the illustrated configuration.

The data files 182 may include any type of information or data for a dataset for storage on a storage device 185. For example, data files 182 may store information for one or more applications for the system 100. The log files 184 may store log information for the system 100. This log information may include real-time information about the database system, such as status information, read/write information, maintenance information, event information and so forth. The control files 186 may include control information which may be used to configure and control various aspects of the system 100.

In some embodiments, the system layout information 190 may include information indicating a storage type and filesystem type and for storage device(s) 185 and/or databases. The system layout information 190 may also include indications of various settings for the storage device(s) 185 and/or databases. These settings may include ASM settings, data guard settings, virtualization settings, and other settings, such as clustering and high availability settings. Embodiments are not limited in this manner.

Figure 2A:
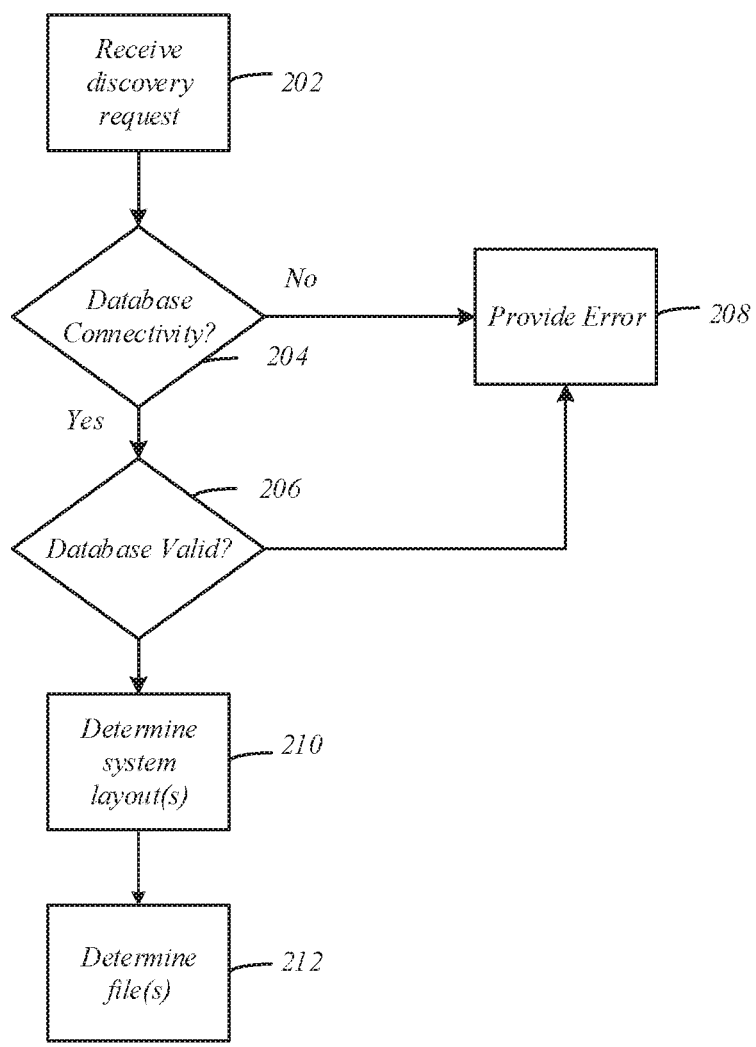
FIG. 2A illustrates an example first logic flow to perform discovery operations.

FIG. 2A illustrates a first example embodiment of a logic flow 200. The logic flow 200 may be representative of some or all of the operations executed by one or more embodiments described herein. For example, the logic flow 200 may illustrate operations performed by one or more components discussed in FIG. 1 to perform discovery operations. These discovery operations may discover one or more databases for one or more datasets. Moreover, the one or more databases may be implemented and store information in one or more storage devices, such as storage devices 185-1 and 185-2 of FIG. 1, which may include one or more disks in disk groups. In some instances, the databases may be implemented in a virtual environment such that information stored in the database is not tied to one particular storage device 185, but may move among storage devices 185. Embodiments are not limited in this manner.

The discovery operations may also include an initial pre-discovery operation performed when one or more components, such as the SCO plugin component 170 and the SCU plugin component 172, are distributed to host devices in packages, for example. In some embodiments, the logic flow 200 may illustrate discovery operations performed while performing a backup operation, which may be subsequent to the initial discovery operation. However, various embodiments are not limited in this manner.

In embodiments, the logic flow 200 may include receiving a discovery request to perform a discovery operation at block 202. For example, a host device 150 may receive a request to perform a discovery operation on one or more storage devices 185 from a server device 102. The request may be in the form of a function call communicated by an SM Core component 124 to a SCO plugin component 170, for example.

In the same or other embodiments, the discovery operation may not be initialized via a request, but may be automatically performed. For example, in response to the server device 102 communicating one or more components to a host device 150 in a package, an initial discovery operation may be performed to discovery resources associated with the host device 150. Embodiments are not limited in this manner.

At decision block 204, a determination may be made as to whether there is connectivity to one or more databases and storage devices, such as storage devices 185-1 and 185-2. For example, the SCO plugin component 170 on a host device 150 and/or the SM Core component 124 may poll or request information from one or more coupled storage devices 185 having one or more databases coupled with the host device 150 via the SCO plugin component 170, the SCU plugin component 172, the VSC component 174, and the SAL component 176. In some instances, a storage device 185 may provide information indicating whether a valid connection exists between a host device 150, the storage device(s) 185 and databases. If a proper connection does not exist, an error message may be provided to the server device 102 at block 208. In some instances, the error message may be returned in a function return to a server device 102. The server device 102 may provide an indication to a user that an error has occurred, e.g. present an error in a graphical user interface (GUI) on a display. Embodiments are not limited in this manner.

At decision block 206 a determination may be made as to whether one or more databases are valid and is a candidate for centralized data management. For example, a SCO plugin component 170 may make the determination based a version number for a database being indicated as a valid database version or not. In some embodiments, the SCO plugin component 170 and may determine whether a database and system layout are supported by the centralized management software based on the database version, for example. In some embodiments, the determination may be based on whether a database has a proper system layout, e.g. storage type, filesystem type, configuration settings, etc. This criteria may be specified by a user of the system at the server device 102, for example. If the database is not valid at block 206, and error may be provided at block 208, as previously discussed.

At block 210, the system layout for a database may be determined. Note, in some instances, this operation may be performed prior to or during the database validation operation discussed at block 206. In some instances, a SCO plugin component 170 may determine a system layout based on system layout information 190 stored on one or more storage devices. Other components may also be utilized to determine system layout information. For example, a SCU plugin component 172 may be used to determine whether the underlying storage devices 185 are configured in a NAS or SAN arrangement. In another example, a VSC component 174 may be utilized to discover whether a database is implemented virtually, utilizing VMDK and/or RDM. Embodiments are not limited in this manner.

The system layout information 190 may detail various configurations for one or more databases which may be associated with a dataset. For example, the system layout information 190 may specify a storage type, e.g. SAN vs. NAS, a filesystem, e.g. XFS, EXT4, etc., and various configuration settings, e.g. ASM vs non-ASM, DataGuard® vs. Active DataGuard® standby, Oracle® DataGuard® real application clusters (RAC) settings and so forth. In addition, the system layout information 190 may specify an underlying storage stack for information stored on storage devices 185 in a database, for example.

In some instances, a system layout may have any combination of configurations, e.g. an Oracle® DataGuard® RAC® database residing on an ASM configured storage device 185. Moreover, a dataset including files 180 for a server device 102 may reside on one or more databases having different or varying system layout configurations. As will be discussed in more detail below, once discovered a single operation may be used to backup these various databases and system layout configurations. For example, a SCO plugin component 170 may dynamically detect a database configuration, and perform the necessary steps for a backup depending on the storage type, filesystem type, and configuration settings for the database. In one specific example, storage devices 185 and databases configured with ASM cause ASM specific discovery operations to detect the underlying storage stack. Embodiments are not limited in this manner.

In some embodiments, the logic flow 200 may include discovering files associated with a dataset at block 212. As previously discussed, the files 180 may include data files 182, log files 184, and control files 186. Embodiments are not limited to these examples and other files may exist for a dataset. These files 180 may be stored on storage device(s) 185 coupled with one or more host devices 150. Components of a host device 150 may perform various operations to discover the files 180. For example, a SCO plugin component 170 may perform a crawl operation to discover the data files 182, log files 184 and control files 184. Other components of the host device 150 may perform additional operations as part of the discovery operation. For example, a SCU plugin component 172 may determine a file to file system mapping for a dataset which may be used by the SCO plugin component 170 to determine the files 180. In another example, a VSC component 174 may be used to determine virtual machine configurations, such as VMWare® information, if the databases is implemented using virtual disks. In some instances, the SCO plugin component 170 may also determine the locations of files 180 associated with a dataset. Embodiments are not limited to these examples.

Figure 2B:
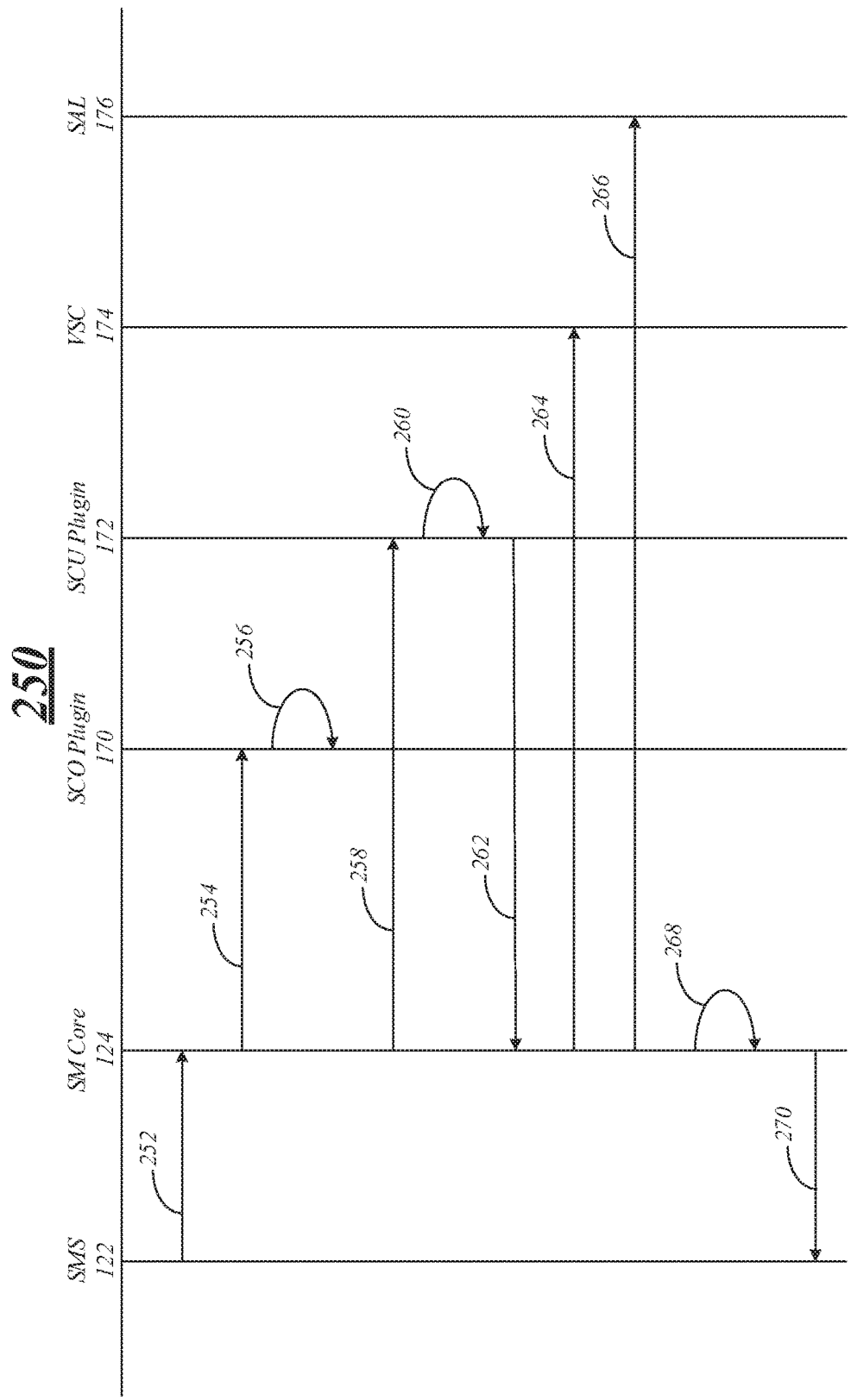
FIG. 2B illustrates an example first communications diagram to perform discovery operations.

FIG. 2B illustrates a first example embodiment of a communications flow 250 to perform discovery operations in a database system, such as system 100. FIG. 2B illustrates the communications flow 250 occurring between a number of components, such as those discussed above in FIG. 1. Thus, reference is made to those components in this example; however embodiments are not limited in this manner.

At line 252, a SMS component 122 may issue a request to perform a discovery operation to an SM Core component 124. The request may be in the form of a function call to the SM Core component 124. Note that the SMS component 122 and SM Core component 124 typically reside within the same device or cluster of devices, such as within a server device 102 as illustrated in FIG. 1. Embodiments are not limited in this manner.

The message flow 250 may include the SM Core component 124 issuing a discovery request to a SCO plugin component 170 at line 254. Similarly, the request may be in the form of a function call to the SCO plugin component 170. Note that the SM Core component 124 and the SCO plugin Component 170 may reside on different devices, e.g. server device 102 and host device 150, respectively. Thus, the request may be communicated via one or more interfaces, e.g. interface 116 and interface 166, over one or more network connections, for example. Embodiments are not limited in this manner.

The SCO plugin component 170 may receive the discovery request and initiate a discovery operation to occur on the host device 150 to discovery resources associated with a dataset which may be indicated in the request received from the SM Core component 124. The discovery of resources may include discovering all of the databases associated with the dataset, all of the files (data files, log files, and control files) and a system layout associated with the databases for the dataset.

In some instances, the SCO plugin component 170 may perform a validation to determine whether connectivity exists with the database at line 256. In some instances, this validation may include determine whether the software type and version of the database is supported by the centralized system management system, e.g. server device 102 and components. Note that the validation at line 256 may occur in parallel with the discovery at line 254. Embodiments are not limited in this manner.

At line 258, the SM Core component 124 may issue a discovery request to the SCU plugin component 172 which may be in the form of a function call to the SCU plugin component 172. The discovery request may be part of the discovery operation and may cause the SCU plugin component 172 to determine or discover file-to-filesystem mappings for dataset(s) and database(s). This mapping may enable other components to discover locations of files for the dataset stored in a database, for example. In some instances, the SCU plugin 172 may also perform validation operations at line 260 in response to receiving the discovery request at line 258. For example, the SCU plugin component 172 may determine whether the filesystem type, vendor and/or underlying storage devices are supported by the centralized system management system. At line 262, the SCU plugin component 172 may return results of the file-to-filesystem mapping and validation to the SM Core component 124. The results may be returned in a return function, for example. Embodiments are not limited in this manner and the information may be communicated via different mechanisms.

At line 264, a SM Core component 124 may communicate a discovery request to a VSC component 174 which may be in the form of a function call. The VSC component 174 may be utilized and perform discovery operations to detect virtualization information, such as virtual disk information, data store, and backup device(s). Embodiments are not limited in this manner. Further and at line 266, the SM Core component 124 may also communicate a discovery request to a SAL component 176 which may also be in the form of a function call. The SAL component 176 may also perform discovery operations relating to the underlying storage stack and devices including, but not limited to, storage component interactions, snapshot creation, single file restore, flexclone creation, and so forth.

At line 268, the SM Core component 124 may determine whether one or more databases are validated. This determination may be based on information received from the SCO plugin component 170, the SCU plugin component 172, the VSC component 174, and the SAL component 176. For example, the SCO plugin component 170 may determine whether the overall system layout and configuration is valid and provide this information to the SM Core component 124. Similarly, the SCU plugin component 172 may indicate whether the filesystem, hardware device vendor, and device type is supported or valid. The SM Core component 124 may also ensure that the data path or LUN path to access files for a dataset or resolvable at line 268.

At line 270, the SM Core component 124 may return a result of the discovery operation to the SMS component 122 indicating the system layout, the files, file locations, and whether the resources are in a valid configuration/setup. The SMS component 122 may enable or disable whether a database is centrally managed based on the results returned at line 270. Embodiments are not limited in this manner.

In some instances, one or more of the components of the host device 150 may provide recommendations based on the validation operations performed. For example, a database sharing an Oracle® ASM disk group with another database can result in a slow recovery process. Thus, a SCO plugin component 170 may provide a recommendation for disk groups to be exclusively provisioned for each database separately, which may be communicated to a server device 102 and presented to a user via a GUI, for example. Embodiments are not limited to this example and other recommendations may be provided based on different configurations. The user may adjust configurations for databases based on recommendations.

Figure 3A:
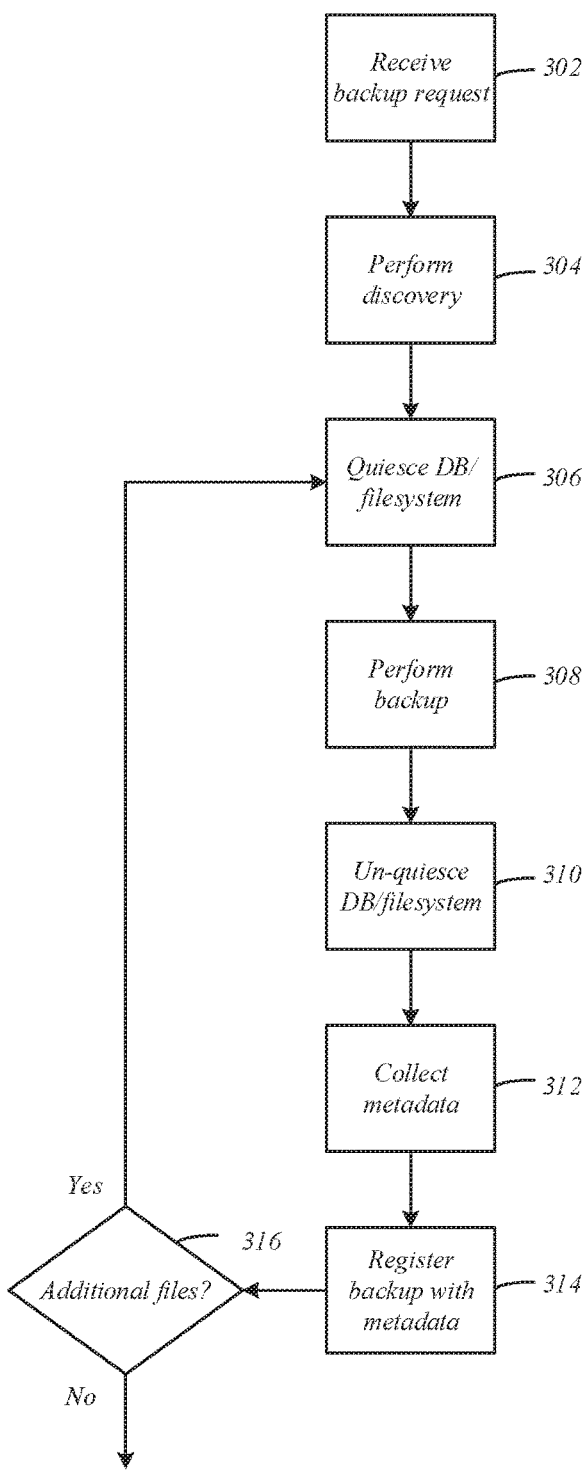
FIG. 3A illustrates an example second logic flow to perform backup operations.

FIG. 3A illustrates an example embodiment of a logic flow 300. The logic flow 300 may be representative of some or all of the operations executed by one or more embodiments described herein. For example, the logic flow 300 may illustrate backup operations performed by components of FIG. 1 to backup one or more databases that may be implemented in a database system to store a dataset. However, various embodiments are not limited in this manner.

As mentioned, these backup operations may be implemented in a centralized system management system, such as system 100, utilizing one or more components that may be distributed to one or more host devices 150 coupled with storage devices 185. For example, the centralized system management system may include NetApp's® Snapcenter® software suite including ONTAP® Snapshot® technology to perform backup operations. Embodiments may include performing application consistent or crash consistent backup operation to backup files for embodiments described herein. More specifically, embodiments implemented herein provide support for backup operations of various types and granularities. For example, system 100 and components enable online backup operations, such that one or more databases for backup may remain in an operational state while the backup operations are being performed. More specifically, read/write instructions (input/output (I/O) operations) may continue happen on the database. Embodiments may include the SCO plugin component 170 utilizing a hot backup mode of operation to perform the online backup and create an application consistent backup.

In another example, system 100 and components may enable offline backup operations such that the databases being backed up are shutdown or changed to an unmounted state prior to the backup operations being performed. Offline backup operations also ensures an application consistent backup. Further and once the backup operations are complete, the databases may be turned back on, put back online, and/or mounted to return to an operational state for utilization.

In a third example, system 100 and components may enable crash consistent backup operations to be performed. For example, the SCO plugin component 170 may take consistency group backups of database storage volumes without performing any operation on the database/filesystem itself. Note that crash consistent backups do not require quiesce and unquiesce and a snapshot of the storage system is taken while live operations (reads/write) are being performed. Embodiments are not limited in this manner.

In some instances, system 100 and components, such as a SCO plugin component 170 may enable backup operations to be performed at various granularities. For example, backup operations may be performed on a complete database including data files, log files, and control files. In another example, backup operations may be performed on archived redo log files only. In a third example, a backup operation may be performed on data files and control files only. In a fourth example, a backup operation may be performed including online redo log files in the backup for crash consistent backups.

In embodiments, the logic flow 300 may include receiving a backup request to perform a backup operation at block 302. The request may be communicated between a SMS component 122 and a SM Core component 124 of a server device 102 as a function call, for example. The request may initiate the SM Core component 124 to perform or cause a backup operation to be performed on one or more databases associated with a dataset. In some instances, as previously discussed, one or more of the databases may include varying configurations and differing system layouts. At block 304, a discovery operation may be performed too discovery resources associated with the one or more databases and dataset. The discovery operation may include operations are previously discussed above in FIGS. 2A and 2B. For example, the discovery operation may include discover resources and system layouts for the databases, including storage types, filesystem types, and configuration settings. Embodiments are not limited in this manner.

At block 306, the database(s) and filesystem(s) may be quiesced, e.g. put into a backup mode operation such that a backup operation may be performed. Further and at block 308, the backup operation may be performed. For example one or more files may be copied and a backup copy of files may be generated. The files may include one or more of data files, control files and log files, such as online redo log files and archived redo log files. The backup copies of these files may be stored in one or more locations on one or more storage devices which may be part of a storage repository associated with the server device 102. Note that in some embodiments, a copy-on-write mechanism may be used to create a snapshot or backed up copies of the files.

In some embodiments, a backup operation can backup information and data including files from more than one database, where each database spans across ASM or non-ASM SAN or NAS layouts, for example. In these instances, the underlying storage volumes may be calculated to minimize a number of snapshots or backups taken for each volume when the volumes across databases. For example, if three volumes exist for a single database, instead of perform three snapshots for each volume, a single snapshot of the three volumes is taken.

At block 310, embodiments may include un-quiescing the database(s) and filesystem(s). For example, the database(s) and filesystem(s) may be put into a normal operational mode to provide storage capabilities. At block 312, metadata may be collected and stored in storage. For example, a SCO plugin component 170 may collect metadata associated with the backup including, but not limited to database information (layout and configuration details) and metadata. The collected information may include pluggable database schema (PDB details) and metadata, tablespace details and metadata, file details and metadata, and so forth. The metadata may store a relational scheme that follows a master/transactional pattern, with static "master" metadata captured once in a very first backup operation and one or more subsequent backup operations capturing the dynamic or "transactional" metadata with reference to the already captured static or "master" metadata. FIG. 3C illustrates one example metadata configuration 390. Embodiments are not limited in this manner. Further, a SCO plugin component 170 may store the backup metadata in a central repository which may be associated with the centralized system management system, such as NetApp's® SnapCenter®.

In some embodiments, the logic flow 300 may include, at block 314, registering files with metadata. For example, embodiments may include the SM Core component 124 communicating information to the SMS component 122 to register the backed up data with metadata. Register the backed up data with the metadata may include creating an association between the data and the metadata. Embodiments are not limited in this manner.

In some instances, blocks 306-314 may be repeated for different file types. For example, during a first backup, data files and associated metadata may be backed up. Thus, a determination as to whether additional files remain for being backed up at block 316 or all of the files make be discovered during the discovery operation and the blocks may repeat. The process may repeat to backup log files and repeat again to backup control files. Embodiments are not limited in this manner.

Figure 3B:
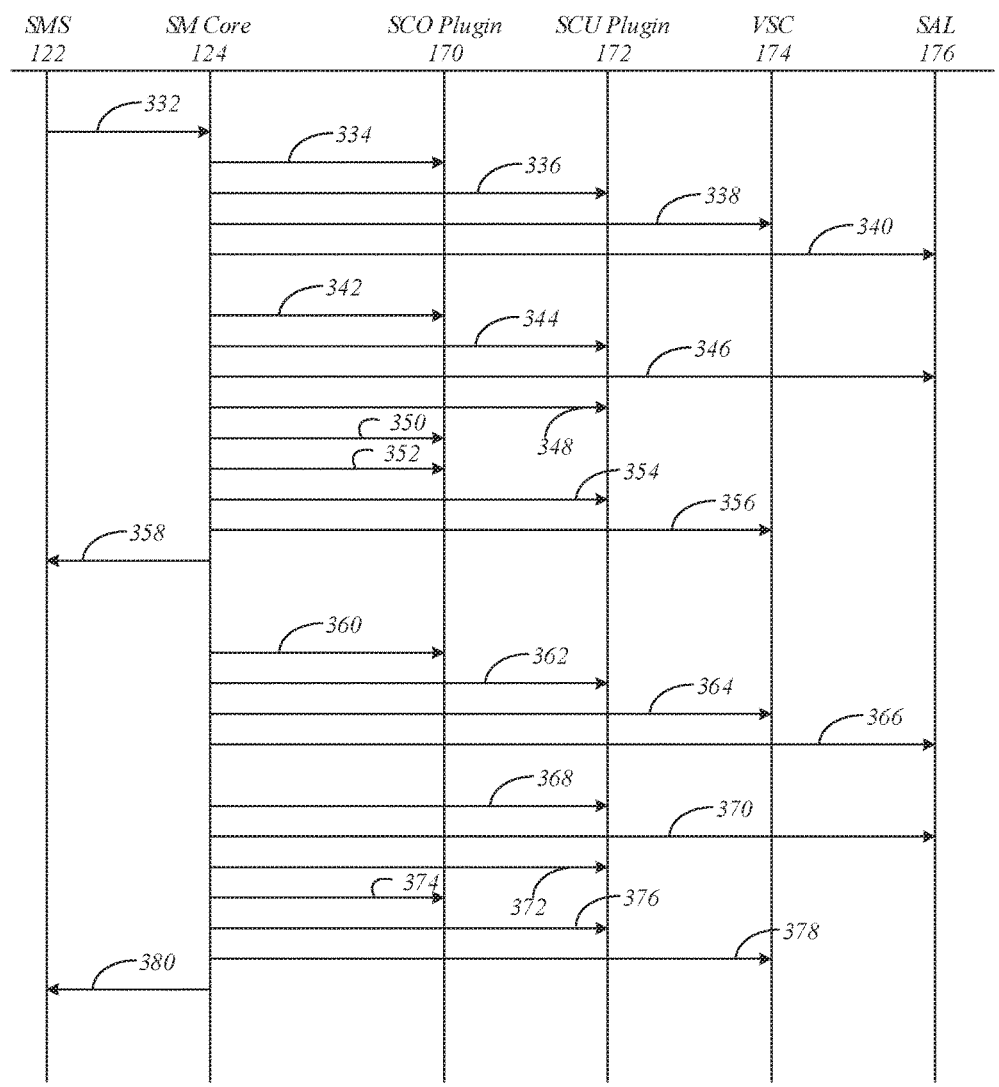
FIG. 3B illustrates an example second communications diagram to perform backup operations.
Figure 3C:
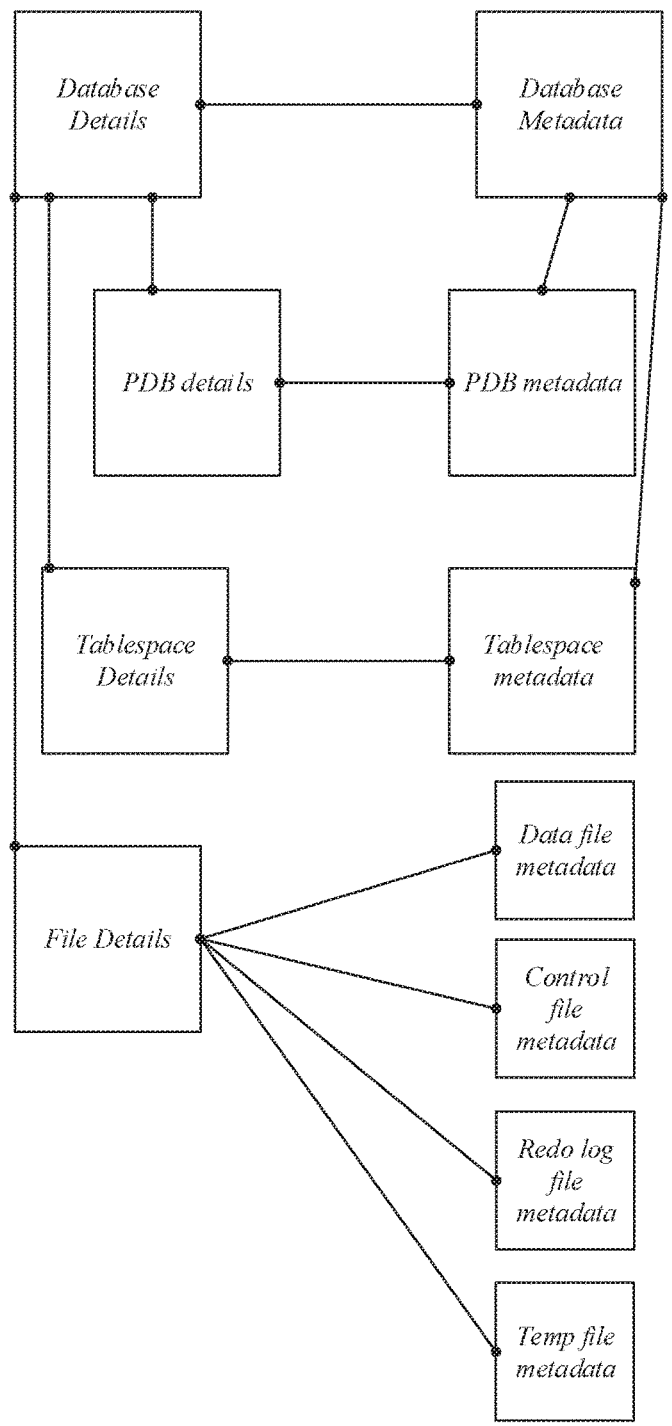
FIG. 3C illustrates an example metadata diagram.

FIG. 3B illustrates an example embodiment of a communications flow 330 to perform backup operations in a database system, such as system 100. FIG. 3B illustrates the communications flow 330 occurring between a number of components, such as those discussed above in FIG. 1. Thus, reference is made to those components in this example; however embodiments are not limited in this manner.

At line 332, a SMS component 122 may communicate a request to perform backup operations to a SM Core component 124. The request may be in the form of a functional call to the SM Core component 124 and may indicate a dataset for which to perform the backup operations. The request may be triggered on a periodic, semi-periodic, or non-periodic basis or by a user of the system 100, for example. Embodiments are not limited in this manner.

In some instances, the request may cause the SM Core component 124 to initiate backup operations for the dataset which may be utilizing one or more databases on one or more storage devices 185, for example. However, to perform the backup operations, the SM Core component 124 may first need to perform discovery operations to discover resources associated with the dataset. These resources may include the one or more databases, storage devices, disk groups, system layout information and so forth. Note that embodiments are not limited in this manner and in some instances, discovery operations may have already been performed for the dataset.

Lines 334 through 340 illustrate communications between a SM Core component 124 of a server device 102 and components of a host device 150 to perform the discovery operations. For example and at line 334, the SM Core component 124 may communicate a discovery request as a function call to the SCO plugin component 170 to detect the files (and locations), such as data files 182, log files 184, and control files 186, associated with the databases and dataset. Further and at line 336, the SM Core component 124 may communicate a discovery request to the SCU plugin component 172 to discover resources such as filesystems for the databases and file-to-filesystem mappings. The SCU plugin component 172 may also provide information such as the vendor and devices of the underlying filesystem structure for a database. At line 338, the SM Core component 124 may communicate a discovery request to the VSC component 174 to determine virtualization information for databases implemented with virtualization. At line 340, the SM Core component 124 may communicate a discovery request to the SAL component 176 to determine storage devices associated with the dataset and databases. Embodiments are not limited in this manner.

At line 342 the SM Core component 124 may communicate information to cause the SCO plugin component 170 to put the one or more databases associated with the database into a quiesced state or a backup mode of operation. In some instances, the quiesced state may prohibit the database from being written to or read from. However, embodiments are not limited in this manner. At line 344, the SM Core component 124 may communicate information to cause the SCU plugin component 172 to put filesystems associated with the dataset and databases into a quiesced state.

At line 346, the SM Core component 124 may communicate information to cause the SAL component 176 to backup data files associated with the dataset. The SAL component 176 may copy the data files to generate backup copies of the data files. In some embodiments, the backup includes point-in-time copies of files, for example. In some instances, these backup copies may be stored online in a storage repository and may be used to restore or clone a dataset. The storage repository may be associated and controlled by the centralized system management system, such as NetApp® storage associated with SnapCenter®.

At lines 348, the filesystem may be unquiesced by the SCU plugin component 172 and at line 350 the database may be unquiesced by the SCO plugin component 170. Thus, the filesystem and database may be put into a normal mode of operation. At lines 352, 354 and 356, metadata relating to the backed up copies of the files may be collected by the SCO plugin component 170, SCU plugin component 172 and VSC component 174, respectively. If a first instance of a backup for the dataset is being performed, the metadata may include static or "master" information relating to the dataset. However, if a subsequent backup operation is being performed, the metadata may include dynamic "transaction" metadata. FIG. 3C illustrates one example metadata configuration 390. Further and at line 358, the data backup for the dataset may be registered with the SMS component 122 with the collected metadata.

The above-described process may be repeated for different file types. For example, lines 360 through 380 illustrate a backup operation for log files associated with the dataset. For example and as similarly discussed above, lines 360 through 366 illustrate communications to cause a discovery operation to be performed by the SCO plugin component 170, the SCU plugin component 172, the VSC component 174, and the SAL component 176, respectively. In the illustrated example, the discovery operation may discover log files and resources associated with the log files, dataset and databases.

At line 368, the filesystem may be quiesced by the SCU plugin component 172 and backup copies of the log files may be generated at line 370 by the SAL component 176. Similar to data files backed up at line 346, archive redo log files may also be stored in a storage repository associated with the centralized system management system. Online redo log files are typically not backed up during the backup operation and therefore are not stored in the storage repository. Control files may not be present or stored in a storage repository associated with centralized system management system as well. The control files may be copied to a data file volume at the time of a backup operation. Embodiments are not limited in this manner.

At line 372, the filesystem may be unquiesced and put into a normal operational mode. Further and at lines 374 through 378 metadata associated with the log files backed up may be collected by the SCO plugin component 170, the SCU plugin component 172, and the VSC component 174. At line 380, the log backup for the dataset may be registered with the SMS component 122 with the collected metadata. Embodiments are not limited to the example communication flow 330 illustrated in FIG. 3B.

In some embodiments, the SCO plugin component 170 may capture missing log files that are not backed up during the back operation performed at line 370. For example, the SCO plugin component 170 may detect missing archive log files in a performant manner and captures their information in backup metadata. More specifically, the SCO plugin component 170 may read directory content for archive log destinations and determines whether a database's dictionary tables are present in the directory content. The SCO plugin component 170 may capture the system change number (SCN) corresponding to the missing archived log files in the backup metadata.

Figure 4A:
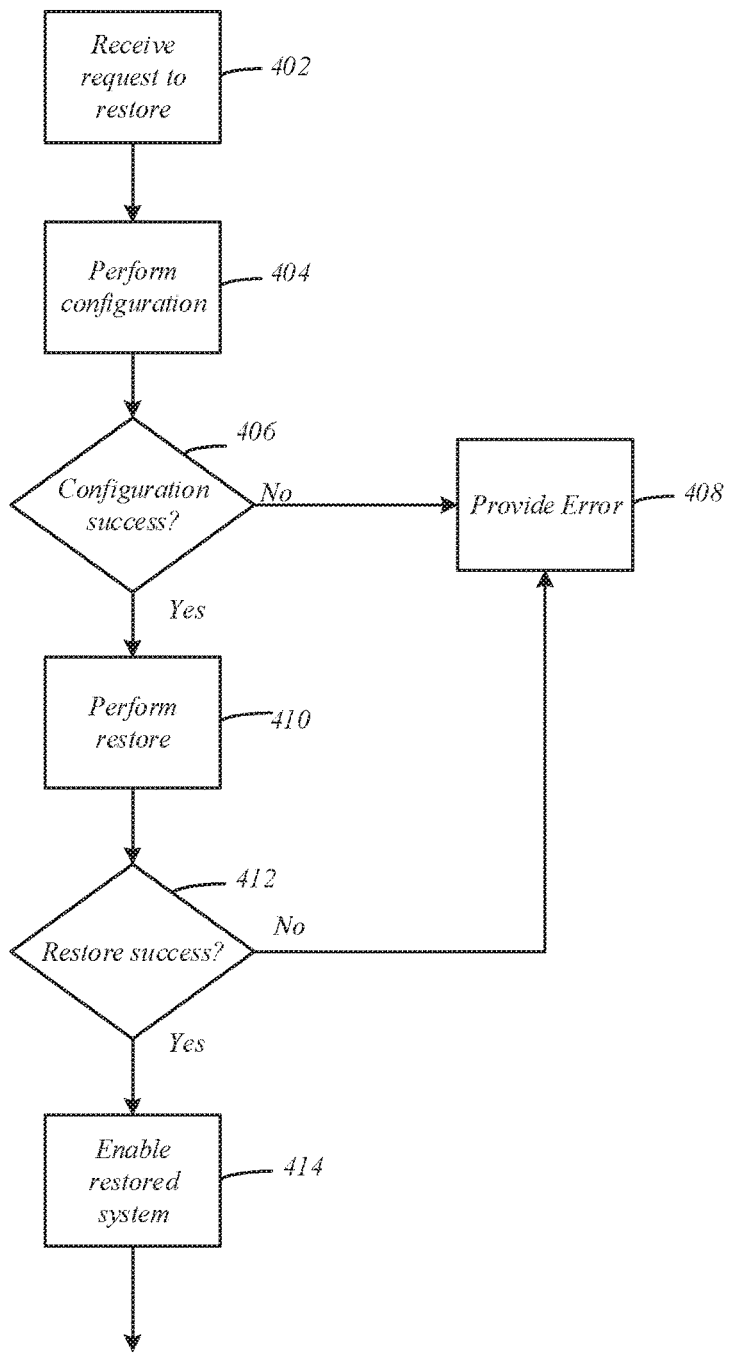
FIG. 4A illustrates an example third logic flow to perform restore operations.

FIG. 4A illustrates a third example of a logic flow 400. The logic flow 400 may be representative of some or all of the operations executed by one or more embodiments described herein. For example, the logic flow 400 may illustrate operations performed by systems of FIG. 1 to perform restore operations. However, various embodiments are not limited in this manner.

In some instances, the logic flow 400 may include receiving a request to restore backed up copies for a dataset at block 402. For example, a SMS component 122 may communicate a request to restore a dataset or backed up copies of files to a SM Core component 124 in the form of a function call or other communication technique. The request may include information indicating a dataset, one or more databases for restoration, a backup location of backed up copies of files, configuration information, and so forth.

At block 404, the logic flow 400 includes performing a configuration to configure database(s) and filesystem(s) capable of operating with the backed up copies of the one or more files. The configuration may include setting one or more databases, pluggable databases (PDBs), tablespace and so forth into a state, e.g. a shutdown state, to receive the backed up copies of the files, process associated RAC state changes, and stop related processes including managed recovery processes (MRPs). For example, the database may be shutdown, the PDB and tablespace may be closed, and so forth. The configuration may also include determining the scope of the restore operation, e.g. entire database, partial database, selected PDB or tablespaces, etc, based on the backed up metadata for the backed up copies. The determination may be based on an indication in the request, for example. Embodiments may also include determining whether the restore operations spans across ASM, putting ASM disk groups into an appropriate state (restore mode), and calculate foreign files. The storage scope stake may also be calculated and non-ASM layouts may also be put into restore mode. Further, a system or file layout may be applied to each of the databases. In some embodiments, the restore mode may be used by the restore operation to perform a single file snapshot for NAS layouts, use SFSR for SAN layouts without foreign files, and performing an operating system copy for SAN layouts with foreign files which may utilize a temporary NetApp® flexclone mounted on the host device 150, for example.

At block 406, a determination may be made as to whether the configuration was successful or not. If the configuration is not successful an error may be provided at block 408.If the configuration is successful, the logic flow 400 may include performing a restoration at block 410. The restoration operation may include copying or moving backed up copies to the configured database(s). As previously mentioned, the restoration may occur for an entire database or selected PDBs. In one illustrative example, three PDBs may be chosen for restoration. Depending on the system layout for each of the PDBs, different restore operations may be performed. For example, a single file snapshot restore (SFSR) method may be used to restore a PDB including files to restore single files from a Snapshot® copy, Snapshot® mount and operating system copy may also be used to restore a PDB, and LUNs for a PDB may also be restored using the SFSR method.

At block 412, a determination may be made as to whether the restoration was successful or not. If the restoration is not successful and error may be provided at block 408. If the restoration is successful, the restored system may be enabled to provide normal operations to one or more applications for the one or more files at block 414. For example, the host storage stack may be brought online in accordance with a system configuration, databases may be brought online, MRP processes may be started, and the LUNs may be cleaned up in the case of databases with ASM layouts. Embodiments are not limited in this manner.

Figure 4B:
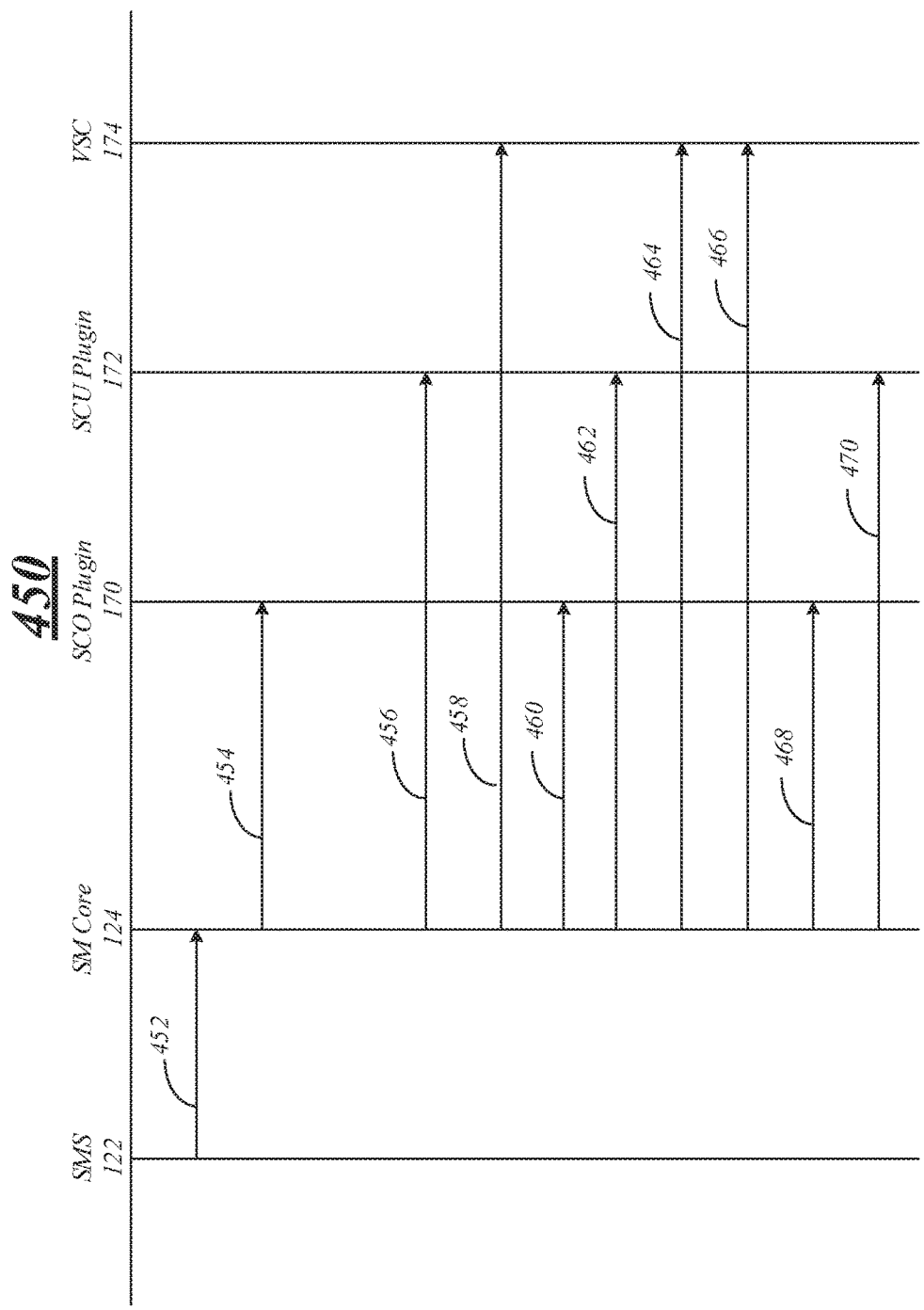
FIG. 4B illustrates an example third communications diagram to perform restore operations.

FIG. 4B illustrates an example of a communications flow 450 to perform restore operations in a database system, such as system 100. FIG. 4B illustrates the communications flow 450 occurring between a number of components, such as those discussed above in FIG. 1. Thus, reference is made to those components in this example; however embodiments are not limited in this manner.

At line 452, a SMS component 122 may communicate a request to perform restore operations to a SM Core component 124. The request may be in the form of a functional call to the SM Core component 124 and may indicate a dataset or backed up copies for which to perform the restore operations. In some instances, the restore operation may be triggered by a user via a GUI input. Embodiments are not limited in this manner. For example, restore operations may be performed automatically after an error has occurred and corrected.

At lines 454 and 456, the SM Core component 124 may initiate pre-restore operations with a SCO plugin component 170 and a SCU plugin component 172 on a host device 150. For example, database(s) and filesystem(s) capable of operating with the backed up copies of the one or more files may be configured. The configuration may include setting one or more databases, pluggable databases (PDBs), tablespace and so forth into a state to receive the backed up copies of the files, process associated RAC state changes, and stop related processes including managed recovery processes (MRPs). The configuration may also include determining the scope of the restore operation, e.g. entire database, partial database, selected PDB or tablespaces, etc, based on the backed up metadata for the backed up copies. Embodiments may also include determining whether the restore operations spans across ASM, putting ASM disk groups into an appropriate state (restore mode), and calculate foreign files which are files that do not belong to the database and therefore are not deleted/overwritten. The storage scope stake may also be calculated and non-ASM layouts may also be put into restore mode. Further, a system or file layout may be applied to each of the databases.

At line 458, the SM Core component 124 may also initiate the pre-restore operation with a VSC component 174. The VSC component 174 may also perform pre-restore operations including validating the scope of the storage stack and setting system layouts, such as non-ASM layouts, to a restore mode and/or bringing down a host storage stack for non-VMDK layouts, for example.

At lines 460, 462 and 464, the SM Core component 124 may initiate restore operations with the SCO plugin component 170, the SCU plugin component 172, and the VSC component 174. The restore operation may include copying or moving backed up copies of files from a storage repository to a database which may be hosted by a host device 150 on a storage device 185, for example. The database may be configured during the pre-restore operations, as previously discussed. The restoration may occur for an entire database or selected PDBs. In one specific example, three PDBs may be chosen for restoration. Depending on the file layout for each of the PDBs, different restore operations may be performed. For example, a single file snapshot restore (SFSR) method may be used to restore a PDB including files to restore single files from a Snapshot® copy, Snapshot® mount and operating system copy may also be used to restore a PDB, and LUNs for a PDB may also be restored using the SFSR method.

At lines 466 and 468, the SM Core component 124 may initiate post-restore operations for the VSC component 174 and the SCO plugin component 170, respectively. For example, the host storage stack may be brought online in accordance with a system configuration, databases may be brought online, MRP processes may be started. Further and at line 470 the SM component 124 may initiate post-restore cleanup operations for the SCU component 172. For example, LUNs associated with the restore may be cleaned up in the case of databases with ASM layouts. Embodiments are not limited in this manner.

Figure 5A:
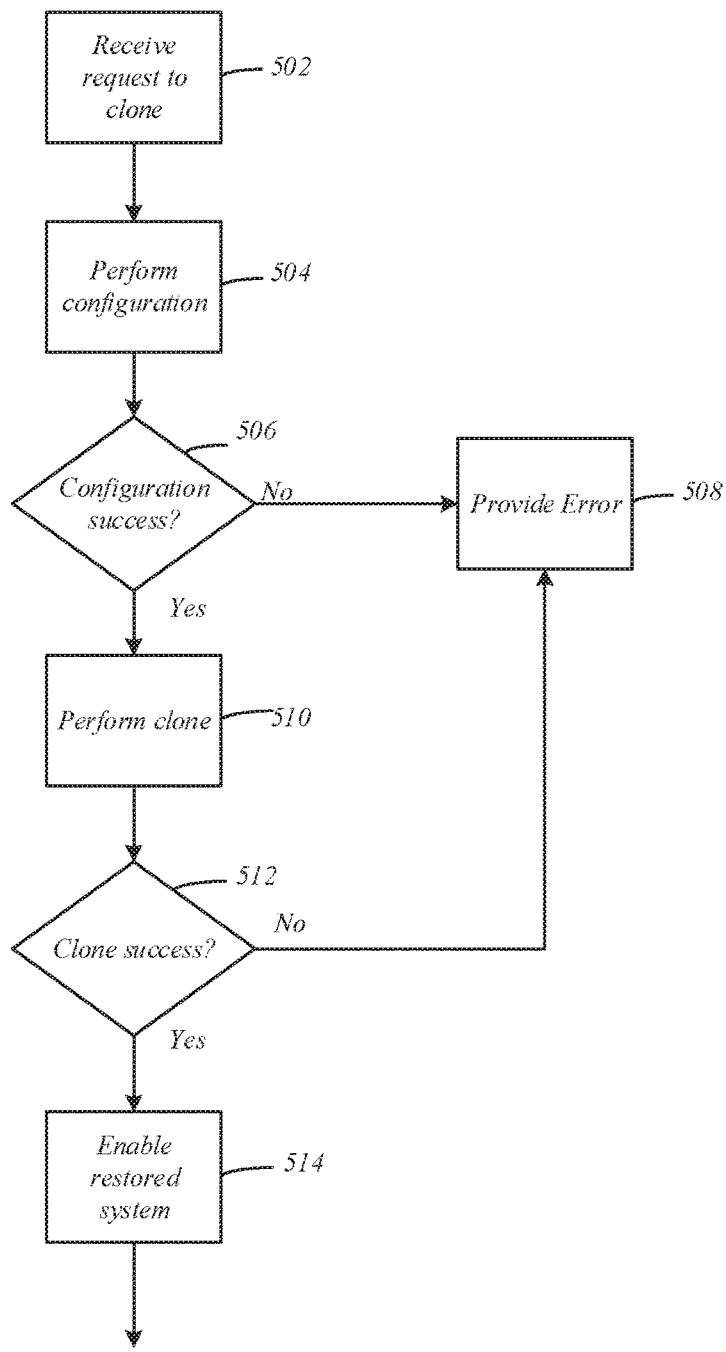
FIG. 5A illustrates an example fourth logic flow to perform clone operations.

FIG. 5A illustrates an example of a logic flow 500. The logic flow 500 may be representative of some or all of the operations executed by one or more embodiments described herein. For example, the logic flow 500 may illustrate operations performed by systems of FIG. 1. However, various embodiments are not limited in this manner.

In some instances, the logic flow 500 may include receiving a request to generate a clone of a database at block 502. At block 504, the logic flow 500 can include performing a configuration to configure the clone database capable of operating with the backed up copies of the one or more files, for example. In some embodiments, the clone database may be a newly generated database or a pre-existing database configured to a same system layout as another database. The system layout may include a specified storage device type, a filesystem, and specified configuration setting such ASM settings, data guard settings, virtualization settings, and so forth. Embodiments are not limited to these examples. ASM settings may include disk group configurations, mirroring configurations, failure group configurations, and so forth. The data guard settings includes settings for standby databases which may be configured on one or more storage devices 185, the settings may include Oracle® Active Data Guard and Active Data Guard Standby. The database virtualization settings may include settings for virtual data partitioning and horizontal data partitioning for virtualized databases. These settings may apply to the clone database such that it matches the cloned database. Embodiments are not limited in this manner.

At block 506, a determination may be made as to whether the configuration was successful or not. If the configuration is not successful an error may be provided at block 508. If the configuration is successful, the logic flow 500 may include performing a clone at block 510. The clone operation may include copying or moving backed up copies to the clone database. Embodiments also include cloning up to a point in time. For example if an error in files in a database is detected, embodiments may include cloning the database to a point in time prior to when the error occurred. This feature may be based on timestamps associated with the backed up copies of the files. At block 512, a determination may be made as to whether the restoration was successful or not. If the restoration is not successful and error may be provided at block 508. If the restoration is successful the restored system may be enabled to provide normal operations to one or more applications for the one or more files at block 514.

Figure 5B:
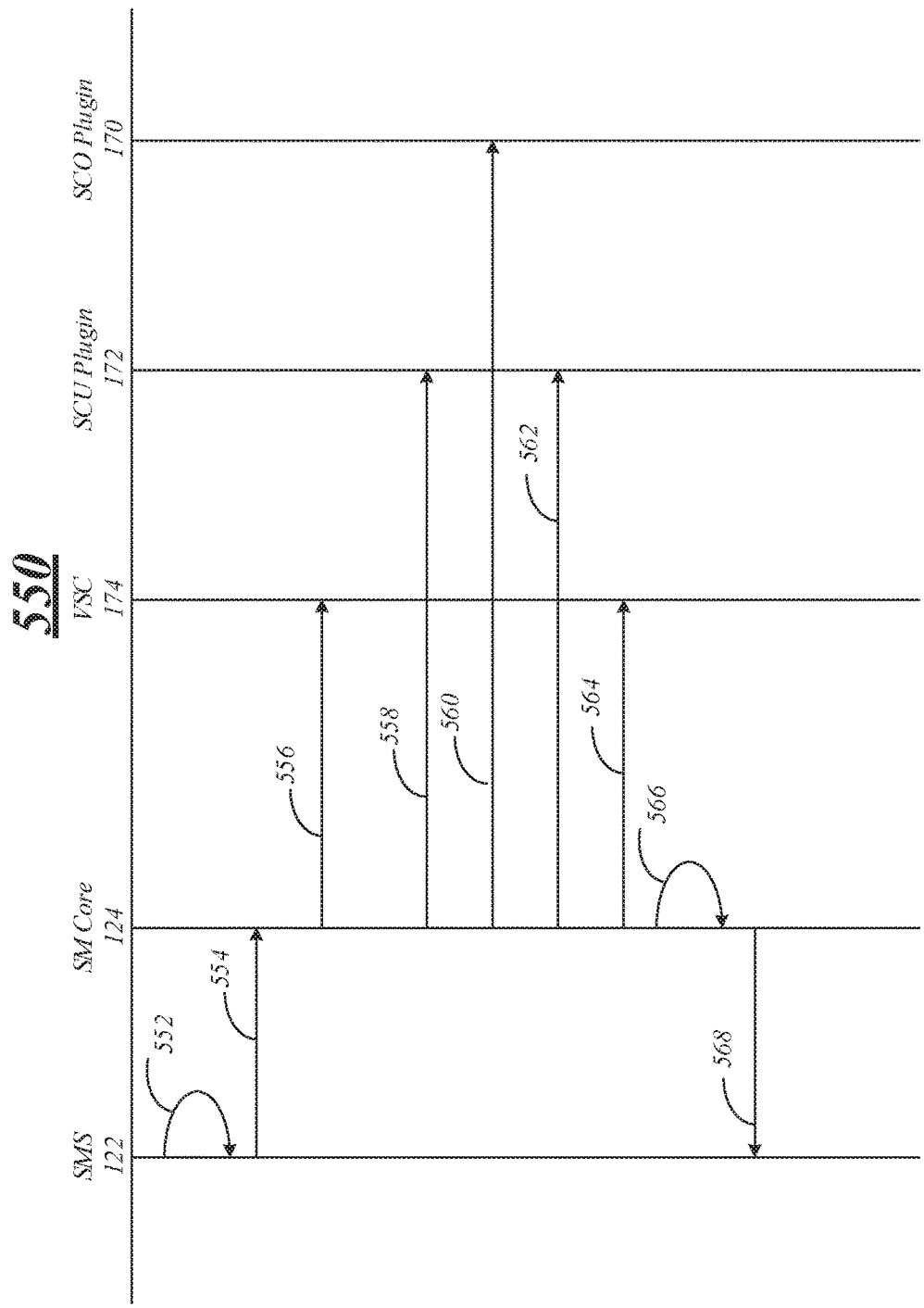
FIG. 5B illustrates an example fourth communications diagram to perform clone operations.

FIG. 5B illustrates an example of a communications flow 550 to perform clone operations in a database system, such as system 100. FIG. 5B illustrates the communications flow 550 occurring between a number of components, such as those discussed above in FIG. 1. Thus, reference is made to those components in this example; however embodiments are not limited in this manner.

At line 552, the SMS component 122 may receive a request to clone a database. At line 554, the SMS component 122 may communicate the request to the SM Core component 124 to initiate the clone operations. The SM Core component 124 may read the metadata associated with the backed up copies of the files for the database that is being cloned. As illustrated in FIG. 3C the metadata may include database metadata, PDB metadata, tablespace metadata, data file metadata, control file metadata, redo log file metadata, and temp file metadata. Although not illustrated, embodiments are not limited to the illustrated metadata and may include other metadata, such as ASMDetails and ASMMetadata. Further,this metadata may include information for use to configure a clone database, including storage disk type, filesystem type, and configuration settings, as previously discussed.

At lines 556, 558, and 560 the SM Core component 124 may initiate the creation of the clone database with the VSC component 174, the SCU plugin component 172 and the SCO plugin component 170, respectively. The VSC component 174 may create a clone of any virtual disks for a storage clone. The SCU plugin component 172 may mount a cloned filesystem stack on the storage devices and the SCO plugin component 170 may clone the database associated with the selected backed up copies of the files. The SCU plugin component 172 may also cause the backed up copies to be copied or moved to the clone database. In some embodiments, the SCO plugin component 170 may also locate any log backups and specify a location for newly generated log files.

At lines 562, 564 and 566, the SM Core component 124 may initiate post clone operations utilizing the SCU plugin component 172, the VSC component 174 and the SM Core component 124 itself. For example, The SCU plugin component 172 may unmount any temporary log backups, the VSC component 174 may delete any temporary virtual disks, and the SM Core component 124 may delete storage device clones related to the temporary log backups. Embodiments are not limited in this manner.

Further and at line 568, the SM Core component 124 may communicate information to the SMS component 122 to register the clone database. For example, clone metadata associated with the clone database may registered and stored in a storage repository.

FIG. 6 illustrates an embodiment of logic flow 600. The logic flow 600 may be representative of some or all of the operations executed by one or more embodiments described herein. For example, the logic flow 600 may illustrate operations performed by systems of FIGS. 1-5. However, various embodiments are not limited in this manner.

In the illustrated embodiment shown in FIG. 6, the logic flow 600 may include performing a discovery operation to determine a system layout for a database and one or more files for a dataset stored in the database at block 605. In some embodiments, the logic flow 600 may include performing a backup operation on the dataset to cause storage of a backup copy of each of the one or more files and collect metadata associated with the backup copy of each of the one or more files, the metadata to enable restoration of the one or more files at block 610.

FIG. 7 illustrates an exemplary embodiment of hardware architecture of a computing device 700. In some embodiments, computing device 700 may be the same or similar as one of the servers. Computing device 700 may include processor 702, memory 704, storage operating system 706, network adapter 708 and storage adapter 710. In various embodiments, the components of computing device 700 may communicate with each other via one or more interconnects, such as one or more traces, buses and/or control lines.

Processor 702 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In various embodiments, computing device 700 may include more than one processor.

In one embodiment, computing device 700 may include a memory unit 704 to couple to processor 702. Memory unit 704 may be coupled to processor 702 via an interconnect, or by a dedicated communications bus between processor 702 and memory unit 704, which may vary as desired for a given implementation. Memory unit 704 may be implemented using any machine-readable or computer-readable media capable of storing data, including both volatile and non-volatile memory. In some embodiments, the machine-readable or computer-readable medium may include a non-transitory computer-readable storage medium, for example. The embodiments are not limited in this context.

The memory unit 704 may store data momentarily, temporarily, or permanently. The memory unit 704 may store instructions and data for computing device 700. The memory unit 704 may also store temporary variables or other intermediate information while the processor 702 is executing instructions. The memory unit 704 is not limited to storing the above discussed data; the memory unit 704 may store any type of data. In various embodiments, memory 704 may store or include storage operating system 706

In various embodiments, computing device 700 may include storage operating system 706 to control storage operations on the computing device 700. In some embodiments, storage operating system 706 may be stored in memory 704 or any other type of storage device, unit, medium, and so forth. The storage operating system 706 may implement a write-anywhere file system that cooperates with virtualization modules to "virtualize" the storage space provided on the storage arrays and storage devices. The file system may logically organize the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of logical data blocks on the disks that are exported as logical unit numbers (LUNs).

The network adapter 708 may include the mechanical, electrical and signaling circuitry needed to connect the computing device 700 to one or more hosts and other storage systems over a network, which may include a point-to-point connection or a shared medium, such as a local area network.

In various embodiments, the storage adapter 710 cooperates with the operating system 706 executing on the computing device 700 to access information requested by a host device, guest device, another storage system and so forth. The information may be stored on any type of attached array of writable storage device media such as video tape, optical, DVD, magnetic tape, bubble memory, electronic random access memory, micro-electro mechanical and any other similar media adapted to store information, including data and parity information. Further, the storage adapter 710 includes input/output (I/O) interface circuitry that couples to the disks over an I/O interconnect arrangement, such as a conventional high-performance, FC serial link topology.

Figure 8:
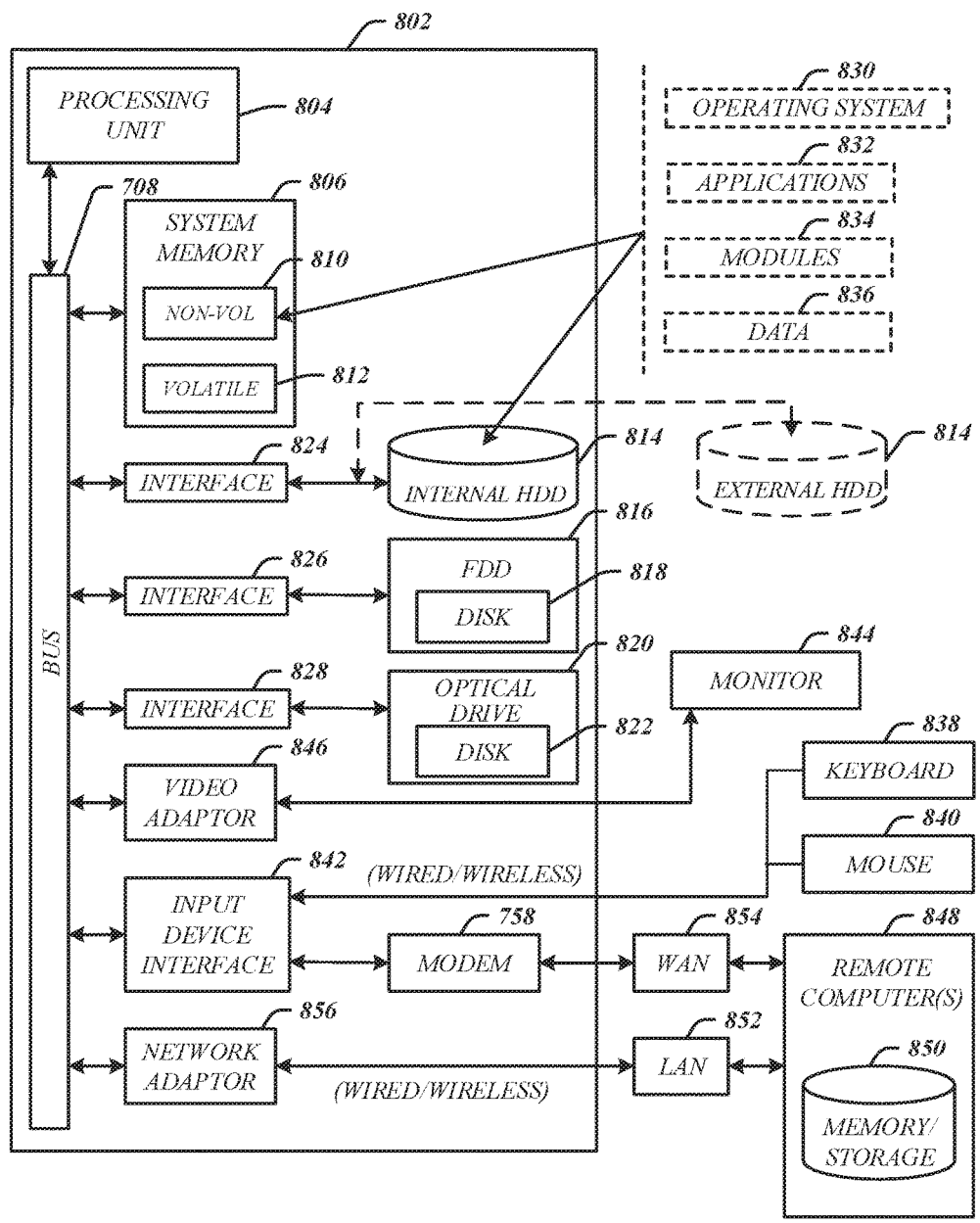
FIG. 8 illustrates an embodiment of a first computing architecture.

FIG. 8 illustrates an embodiment of an exemplary computing architecture 800 suitable for implementing various embodiments as previously described. In one embodiment, the computing architecture 800 may include or be implemented as part of computing system, such as any of the previously discussed systems.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the storage system 100 as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   memory;
   logic, at least partially implemented in circuitry coupled with the memory, the logic to:
   perform a discovery operation by a plurality of plugins to determine a system layout for a database and one or more files for a dataset stored in the database;
   validate the database as a candidate for centralized management by a server based on information provided by the plurality of plugins; and
   perform by using the plurality of plugins, a backup operation on the dataset to cause storage of a backup copy of each of the one or more files and collect metadata associated with the backup copy of each of the one or more files, the metadata stored in a relational scheme to enable restoration of the one or more files; wherein the relational scheme stores static metadata data and dynamic transactional metadata related to the static metadata.

2. The apparatus of claim 1, the logic to cause the database to enter a quiesced state prior to performing the backup operation and exit the quiesced state subsequent to performing the backup operation.

3. The apparatus of claim 1, the one or more files comprising at least one of data files, control files, online redo log files, and archived redo log files, and the backup operation to cause storage of the backup copy for at least one of the data files, the control files, the online redo log files, and the archived redo log files.

4. The apparatus of claim 1, the system layout comprising a storage type, a filesystem, and one or more system settings comprising at least one of an automatic storage management setting, a data guard setting, and a virtualization setting.

5. The apparatus of claim 1, the logic to perform the backup operation on the dataset stored on the database comprising at least two different system layouts.

6. The apparatus of claim 1, the logic to perform the backup operation on a dataset stored on two or more databases comprising at least two different system layouts.

7. The apparatus of claim 1, the logic to collect the static metadata during an initial backup operation and the dynamic transactional metadata during one or more subsequent backup operations, the dynamic transactional metadata comprising transactions associated with the one or more files.

8. The apparatus of claim 1, the logic to restore the backup copy of each of the one or more files in a database having at least two different system layouts.

9. The apparatus of claim 1, the logic to clone the database via generating a new database having a same system layout as the system layout and utilizing the backup copy of each of the one or more files.

10. A computer-implemented method, comprising:
performing a discovery operation by a plurality of plugins to determine a system layout for a database and one or more files for a dataset stored in the database;
validating the database as a candidate for centralized management by a server based on information provided by the plurality of plugins; and
performing by using the plurality of plugins, a backup operation on the dataset to cause storage of a backup copy of each of the one or more files and collect metadata associated with the backup copy of each of the one or more files, the metadata stored in a relational scheme to enable restoration of the one or more files; wherein the relational scheme stores static metadata data and dynamic transactional metadata related to the static metadata.

11. The computer-implemented method of claim 10, comprising causing the database to enter a quiesced state prior to performing the backup operation and exit the quiesced state subsequent to performing the backup operation.

12. The computer-implemented method of claim 10, the one or more files comprising at least one of data files, control files, online redo log files, and archived redo log files, and the backup operation to cause storage of the backup copy for at least one of the data files, the control files, the online redo log files, and the archived redo log files.

13. The computer-implemented method of claim 10, the system layout comprising a storage type, a filesystem, and one or more system settings comprising at least one of an automatic storage management setting, a data guard setting, and a virtualization setting.

14. The computer-implemented method of claim 10, comprising performing the backup operation on the dataset stored on the database comprising at least two different system layouts.

15. The computer-implemented method of claim 10, comprising performing the backup operation on a dataset stored on two or more databases comprising at least two different system layouts.

16. The computer-implemented method of claim 10, comprising collecting the static metadata during an initial backup operation and the dynamic transactional metadata during one or more subsequent backup operations, the dynamic transactional metadata comprising transactions associated with the one or more files.

17. The computer-implemented method of claim 10, comprising restoring the backup copy of each of the one or more files in a database having at least two different system layouts.

18. The computer-implemented method of claim 10, comprising cloning the database via generating a new database having a same system layout as the system layout and utilizing the backup copy of each of the one or more files.

19. A non-transitory computer-readable storage medium comprising a plurality of instructions that, when executed by processing circuitry, enable the processing circuitry to:
perform a discovery operation by a plurality of plugins to determine a system layout for a database and one or more files for a dataset stored in the database;
validate the database as a candidate for centralized management by a server based on information provided by the plurality of plugins; and
perform by using the plurality of plugins, a backup operation on the dataset to cause storage of a backup copy of each of the one or more files and collect metadata associated with the backup copy of each of the one or more files, the metadata stored in a relational scheme to enable restoration of the one or more files; wherein the relational scheme stores static metadata data and dynamic transactional metadata related to the static metadata.

20. The non-transitory computer-readable storage medium of claim 19, comprising instructions that when executed enable the processing circuitry to cause the database to enter a quiesced state prior to performing the backup operation and exit the quiesced state subsequent to performing the backup operation.

21. The non-transitory computer-readable storage medium of claim 19, the one or more files comprising at least one of data files, control files, online redo log files, and archived redo log files, and the backup operation to cause storage of the backup copy for at least one of the data files, the control files, the online redo log files, and the archived redo log files.

22. The non-transitory computer-readable storage medium of claim 19, the system layout comprising a storage type, a filesystem, and one or more system settings comprising at least one of an automatic storage management setting, a data guard setting, and a virtualization setting.

23. The non-transitory computer-readable storage medium of claim 19, comprising instructions that when executed enable the processing circuitry to perform the backup operation on the dataset stored on the database comprising at least two different system layouts.

24. The non-transitory computer-readable storage medium of claim 19, comprising instructions that when executed enable the processing circuitry to perform the backup operation on a dataset stored on two or more databases comprising at least two different system layouts.

25. The non-transitory computer-readable storage medium of claim 19, comprising instructions that when executed enable the processing circuitry to collect the static metadata during an initial backup operation and the dynamic transactional metadata during one or more subsequent backup operations, the dynamic transactional metadata comprising transactions associated with the one or more files.

26. The non-transitory computer-readable storage medium of claim 19, comprising instructions that when executed enable the processing circuitry to restore the backup copy of each of the one or more files in a database having at least two different system layouts.

27. The non-transitory computer-readable storage medium of claim 19, comprising instructions that when executed enable the processing circuitry to clone the database via generating a new database having a same system layout as the system layout and utilizing the backup copy of each of the one or more files.

* * * * *